United States Patent

Vasseur et al.

[11] Patent Number: 5,779,411
[45] Date of Patent: Jul. 14, 1998

[54] PRE-ASSEMBLY NUT MADE OF PLASTIC

[75] Inventors: Jean-Christophe Vasseur. Eimeldingen, Germany; Alain Villerot, Giromagny, France

[73] Assignee: ITW De France, Beauchamp, France

[21] Appl. No.: 775,554

[22] Filed: Dec. 31, 1996

[30] Foreign Application Priority Data

Feb. 26, 1996 [FR] France .................. 96 02337

[51] Int. Cl.⁶ .................. F16B 13/06; F16B 37/04; F16B 19/06
[52] U.S. Cl. .................. 411/55; 411/508; 411/182
[58] Field of Search .................. 411/55, 60, 48, 411/508, 509, 913, 182, 180

[56] References Cited

U.S. PATENT DOCUMENTS

| 2,936,015 | 5/1960 | Rapata ........................ 411/182 |
| 3,115,804 | 12/1963 | Johnson . |
| 3,122,386 | 2/1964 | Pearson . |
| 3,141,489 | 7/1964 | Rapata ........................ 411/182 |
| 3,144,695 | 8/1964 | Budwig . |
| 4,218,954 | 8/1980 | Morel . |
| 4,286,642 | 9/1981 | Keatley . |
| 4,376,605 | 3/1983 | Thomsen ...................... 411/182 |
| 4,821,381 | 4/1989 | Kaneko ........................ 411/48 |
| 5,106,225 | 4/1992 | Andre ........................... 411/182 |
| 5,269,640 | 12/1993 | Jonishi ......................... 411/182 |
| 5,536,125 | 7/1996 | Gaw ............................. 411/182 |
| 5,537,714 | 7/1996 | Lynch ........................... 411/182 |

FOREIGN PATENT DOCUMENTS 8701419  3/1987  WIPO .................. 411/182

*Primary Examiner*—Flemming Saether
*Attorney, Agent, or Firm*—Schwartz & Weinrieb

[57] ABSTRACT

A clip (2) fitted by snapping into a component-carrying lug (40) and then snapped into the head (5) of a nut/pin (1). The assembly thus formed is advantageously further complemented by a screw (15) which can also be engaged in the nut and can be presented en bloc opposite a aperture (51) formed for this purpose in a support (50).

25 Claims, 2 Drawing Sheets

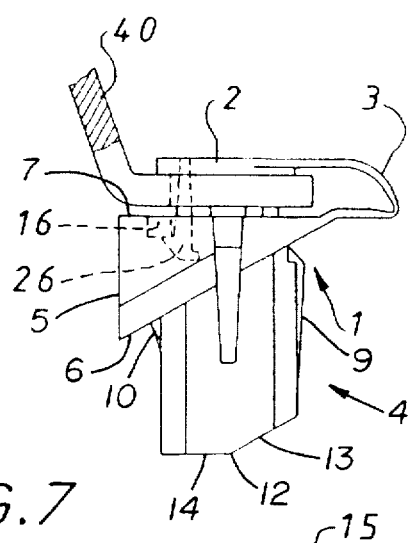
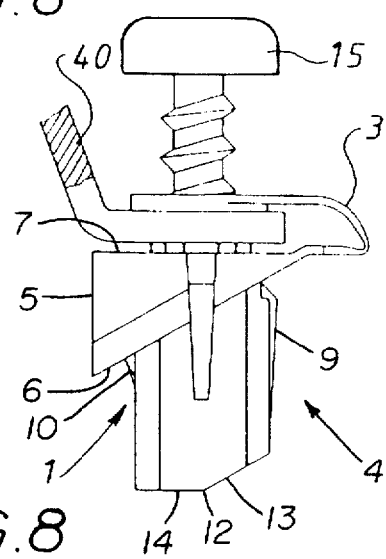
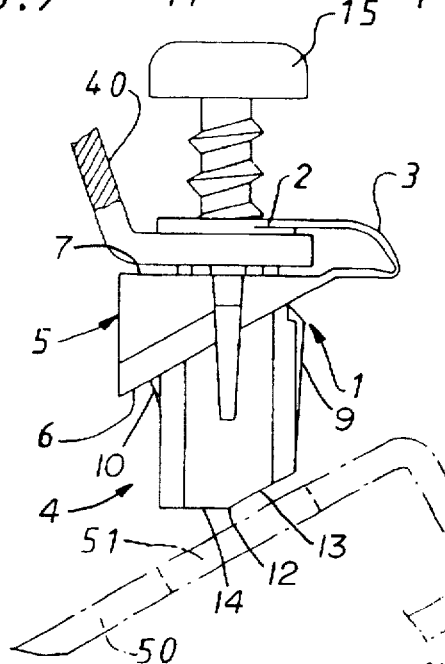
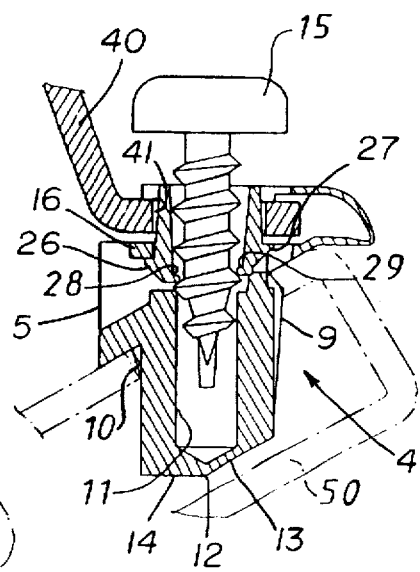
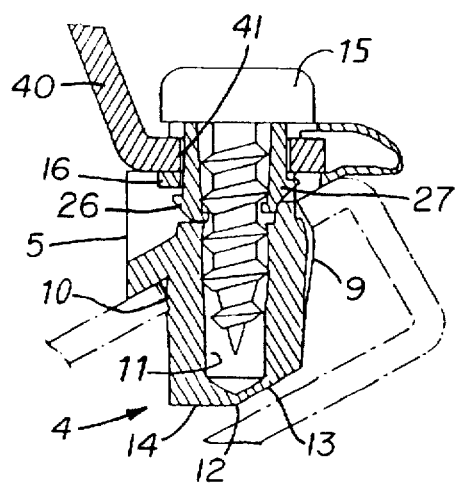

PRE-ASSEMBLY NUT MADE OF PLASTIC

FIELD OF THE INVENTION

The present invention concerns a device for fixing a component to a support, and more especially a support which is not accessible from behind, this device being of the snapping nut type molded from plastic.

BACKGROUND OF THE INVENTION

Various forms of devices of this type are known, but their use still presents problems, notably in relation to access, even from the front.

Difficulties may thus be encountered in the fixing of the component onto the support, such an operation necessitating the disposition of the component in front of the nut previously inserted into a housing, and then the positioning of a screw generally fitted with an application washer or similar element, this screw having to pass through a component-carrying lug so as to be engaged in the nut and finally screwed into it.

OBJECT OF THE INVENTION

The present invention proposes to this end a device which greatly facilitates this type of operation.

SUMMARY OF THE INVENTION

The present invention proposes to this end a device for fixing a component to a support comprising a nut body adapted to fit into an opening formed for this purpose in a wall of a support, this body comprising a shaft with a head on top, this head having a bearing face and a reception face, characterized by the association with a the nut body of a clip adapted to receive, with snapping-in operation, a component-carrying lug and then to snap itself into the said reception face of the head.

A component/nut/clip assembly is thus obtained which is suitable for being pre-assembled ready so as to receive a fixing screw, so as to be able to be snapped, in a single operation, into a housing provided for this purpose on the support to which the said component is to be fixed. The screwing of the screw, pre-engaged in the nut, consequently enables the component to be fixed firmly to the support.

BRIEF DESCRIPTION OF THE DRAWINGS

The characteristics and advantages of the invention will moreover emerge from the description which follows by way of example with reference to the accompanying drawings, in which like reference characters designate like or corresponding parts throughout the several views,and wherein:

FIG. 5 is a view similar to that of FIG. 1 showing the component-carrying lug thus mounted with the clip pressed down on the head of the nut;

FIG. 6 is a similar view, showing a screw engaged in the lug/nut assembly,

FIG. 7 is a front view showing the component-carrying lug, nut, and screw assembly thus formed, disposed in front of a support opening;

FIG. 8 is a view in cross section of the said assembly engaged in the support; and FIG. 9 is a similar view in cross section, with the screw engaged to its full extent in the nut body.

DETAILED DESCRIPTION OF THE PREFERRED EMBODIMENT

Figure 1:
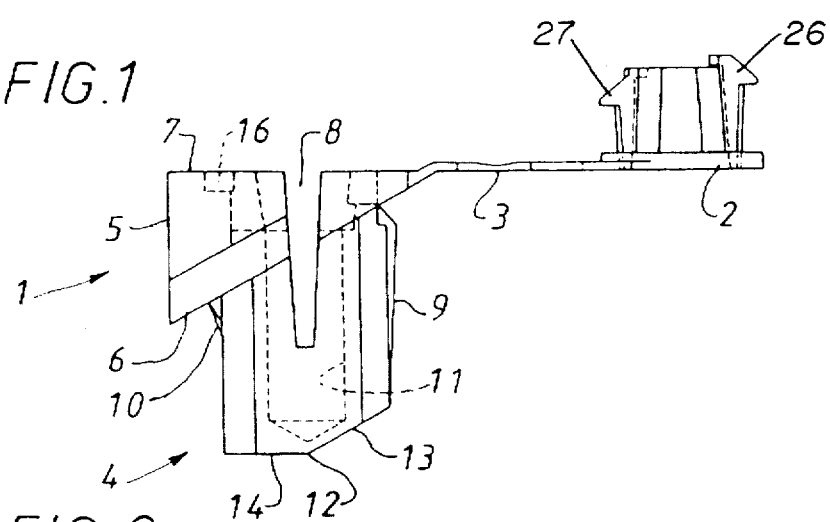
FIG. 1 is a front view of a nut according to the present invention.

According to the embodiment chosen and depicted, the device comprises a nut body 1 and a holding clip 2, connected to each other by a fastener 3.

The body 1 comprises, as shown, a shaft 4 supporting a head 5. The head 5 has a bottom face 6 called a bearing face and a top face 7 called a reception face.

According to the embodiment chosen, the faces 6 and 7 are not parallel to each other, but it is quite possible to imagine another embodiment in which the said faces are mutually parallel.

The shaft 4 and the head 5 have a slot 8 passing through them, splayed towards the top approximately from the mid-height of the shaft 4.

The shaft 4, which has a rectangular cross section overall, has, as shown, on two parallel faces serrations 9 and an anchoring area 10 adjacent to the bearing face 6 and perpendicular thereto. Furthermore, an axial bore 11 is formed in the nut body 1 so as to form therein a blind hole extending downwardly adjacent to the end face 12.

This face 12 has a bevelled part 13 parallel to the bearing face 6 and a part 14 parallel to the reception face 7.

On the bearing head 5, there is formed a catch 16 for retaining the clip 2.

Figure 2:
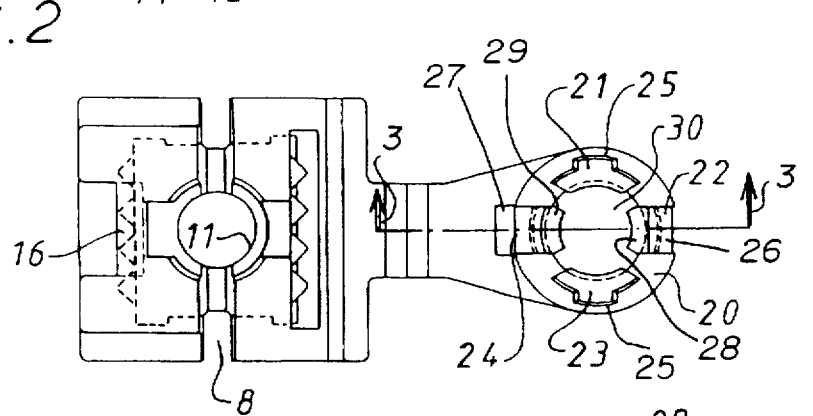
FIG. 2 is a plan view of the nut.

The clip 2 is connected to the nut body 1 by a fastener 3 extending, as may be seen in FIG. 2. in line with the reception face 7 of the head 5 and perpendicular to the slot 8.

The clip 2 has a head 20, with four blades 21, 22, 23 and 24 on top. The four blades 21, 22, 23 and 24 are disposed on a circle, distributed in pairs on two mutually perpendicular radial lines. Thus the diametrically opposed blades 21, 23 are disposed on a radial line parallel to the slot 8. The other radial line, meanwhile, in line with the fastener 3, carries the two other blades 22, 24.

Figure 3:
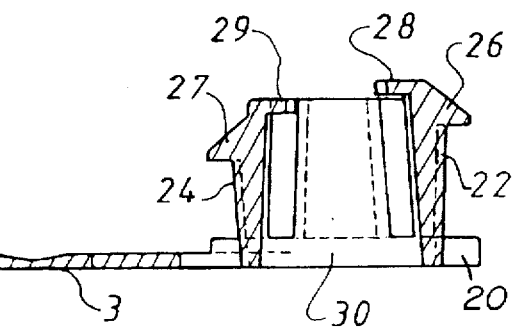
FIG. 3 is a view in cross section of the clip, in the direction 3—3 in the preceding figure.
Figure 4:
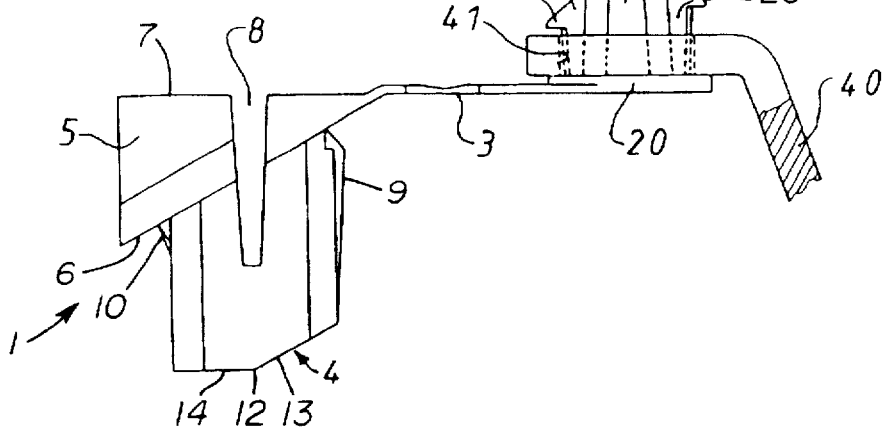
FIG. 4 is a view similar to that of FIG. 1 illustrating the engagement of the holding clip according to the invention, in a component-carrying lug.

The two blades 21, 23 each have a guide rib 25 (FIG. 2). The blade 22 (FIG. 3), opposite the fastener 3, has at its free end an external tooth 26 and an internal tooth 28; the blade 24, adjacent to the fastener/clip connection, has an external tooth 27 at approximately two thirds of its height and an internal tooth 29 at its end.

The head 20 of the clip 2 has a recessed central area 30 with a diameter sufficient to permit the passage of a screw 15 or an equivalent element.

With reference to FIGS. 4 to 9, the procedure for the fitting of a component (not shown) fixed to a component-carrying lug 40 with a hole or passage 41 in it (FIG. 4), in which the first step is to engage the clip head 20 by snap-engaging the same, will now be described. The four blades 21, 22, 23 and 24 will retract elastically. Only the external tooth 27 of the blade 24 will be locked in contact with the component-carrying lug 40. The latter is consequently retained between the clip head 20 and the tooth 27 of the blade 24.

The clip 2 is then engaged on the nut body 1, whilst tilting the latter, the fastener 3 being of sufficient length to enable the nut body 1, with respect to the component-carrying lug 40, clip assembly, to pivot with flexion of the fastener 3.

The snapping-in (FIG. 5) of the clip 2 on the head 5 is facilitated by the presence of the two ribs 25 disposed parallel to the slot 8; the ribs 25 being adapted to engage in the slot 8. The engagement of the ribs 25 in the slot 8, which leaves a clearance enabling the nut 1 to retain its elasticity, affords guidance which enables the tooth 26 on the blade 22 to be snapped firmly under the catch 16 formed on the nut head 5.

The component-carrying lug 40 is consequently fixed to the body/clip assembly. There follows (FIG. 6) the positioning of the expansion screw 15, which finds its passage through the hole 41 in the component-carrying lug 40, and then the recessed central area 30 of the clip 2, to find its end disposed at the entry to the axial bore 11.

A simple pressure exerted on the expansion screw 15 enables the thread of the screw 15 to pass through the teeth 28, 29 on the blades 22, 24 of the clip head 20; the screw 15 is thus fixed to the clip/nut assembly.

The assembly formed by the component-carrying lug 40, the nut 1 and the screw 15 can be engaged, in a single operation, in a an aperture 51 formed in a support 50 of any shape (FIG. 7).

The precise positioning of the assembly thus obtained is made notably through the bearing face 6 cooperating with the surface of the support 50 and 20 with the elasticity retained by the nut body 1 up to this point. This positioning is, moreover, facilitated by the specific shape of the bevelled part 13 of the distal face 12 of the shaft 4.

In order to complete the fitting, the expansion screw 15 simply needs to be screwed in fully, thereby locking, through the degree of freedom resulting from the slot 8, the fixing area 10 against the corresponding walls of the aperture 51 as the screw 15 advances, with self-screwing into the bore 11. The fixing operation thus obtained (FIG. 9) is improved and strengthened by the plastic deformations which the serrations 9 undergo.

Obviously, many modifications and variations of the present invention are possible in light of the above teachings. It is therefore to be understood that within the scope of the appended claims, the present invention may be practiced otherwise than as specifically described herein.

We claim:

1. A fastener assembly for mounting a component upon a support member, comprising:

a body member having a head portion, and a body portion for insertion within an aperture defined within a support member upon which a component is to be mounted; and a clip member, for supporting a component which is to be mounted upon a support member, adapted to be mounted upon said body member, said clip member comprising a head portion and a longitudinal axis;

retaining means provided upon said clip member and disposed upon one side of said head portion of said clip member so as to be axially spaced from said head portion of said clip member and thereby be able to cooperate with said head portion of said clip member in retaining a component upon said clip member;

first engagement means provided upon said clip member and disposed upon one side of said head portion of said clip member so as to be axially spaced from said head portion of said clip member; and second engagement means provided upon said head Portion of said body member for engaging said first engagement means of said clip member so as to mount a component, which is retained upon said clip member, upon a support member when said body portion of said body member is disposed within an aperture defined within the support member and said clip member, having the component, which is to be mounted upon the support member, retained thereon, is engaged with said body member as a result of the engagement of said first engagement means of said clip member with said second engagement means of said body member.

2. A fasterner assembly as set forth in claim 1, further comprising:

fastener means for integrally connecting said clip member to said body member.

3. A fasterner assembly as set forth in claim 2, wherein:

said body member has a longitudinal axis;

said fastener means extends radially outwardly from each one of said body member and said clip member and with respect to each one of said longitudinal axes of said body member and said clip member.

4. A fastener assembly as set forth in claim 3, wherein:

said fastener means is flexible so as to permit said clip member to be substantially coaxially disposed with respect to said body member when said second engagement means of said body member is engaged with said first engagement means of said clip member.

5. A fastener assembly as set forth in claim 4, wherein:

said retaining means of said clip member comprises a first tooth, extending radially outwardly with respect to said longitudinal axis of said clip member, for engaging the component to be retained upon said clip member;

said first engagement means of said clip member comprises a second tooth extending radially outwardly with respect to said longitudinal axis of said clip member; and said second engagement means of said body member comprises a catch for engaging said second tooth of said clip member.

6. A fastener assembly as set forth in claim 5, wherein:

said first and second teeth of said clip member are disposed upon flexible blade members which are mounted upon said clip member at diametrically opposite positions with respect to said longitudinal axis of said clip member.

7. A fastener assembly as set forth in claim 6, wherein:

said body member has slot means defined therein for permitting said body member to be radially expanded when a fastener is axially inserted into said body member such that said body member can fixedly engage sidewall portions of the support which define the aperture into which said body member is to be inserted.

8. A fastener assembly as set forth in claim 7, wherein:

said clip member comprises additional radially inwardly extending teeth means disposed upon said diametrically opposed blade members for engaging the fastener when the fastener is axially inserted into said clip member and said body member so as to fixedly retain the fastener within said fastener assembly and thereby fixedly retain said body member in its radially expanded state within the aperture defined within the support member upon which the component is to be mounted by said fastener assembly.

9. A fastener assembly as set forth in claim 1, wherein:

said body member has a longitudinal axis; and said clip member is substantially coaxially disposed with respect to said body member when said first engagement means of said clip member is engaged with said second engagement means of said body member.

10. A fastener assembly as set forth in claim 9, wherein:

said retaining means of said clip member comprises a first tooth, extending radially outwardly with respect to said longitudinal axis of said clip member, for engaging the component to be retained upon said clip member;

said first engagement means of said clip member comprises a second tooth extending radially outwardly with respect to said longitudinal axis of said clip member; and said second engagement means of said body member comprises a catch for engaging said second tooth of said clip member.

11. A fastener assembly as set forth in claim 9, wherein:

said first and second teeth of said clip member are disposed upon flexible blade members which are mounted upon said clip member at diametrically opposite positions with respect to said longitudinal axis of said clip member.

12. A fastener assembly as set forth in claim 11, wherein:

said body member has axial slot means defined therein for permitting said body member to be radially expanded when a fastener is axially inserted into said body member such that said body member can fixedly engage sidewall portions of the support member which define the aperture into which said body member is to be inserted.

13. A fastener assembly as set forth in claim 12, wherein:

said clip member comprises additional radially inwardly extending teeth means disposed upon said diametrically opposite blade members for engaging a fastener when a fastener is axially inserted into said clip member and said body member so as to fixedly retain a fastener within said fastener assembly and thereby fixedly retain said body member in its radially expanded state within the aperture defined within the support member upon which the component is to be mounted by said fastener assembly.

14. In combination, a fastener system for mounting a component upon a support member, comprising:

a body member for insertion within an aperture defined within a support member upon which a component is to be mounted; and a clip member, for supporting a component which is to be mounted upon a support member, adapted to be mounted upon said body member;

retaining means provided upon said clip member for retaining a component upon said clip member;

first engagement means provided upon said clip member;

second engagement means provided upon said body member for engaging said first engagement means of said clip member so as to mount a component, which is retained upon said clip member, upon a support member when said body member is disposed within an aperture defined within the support member, and said clip member, having the component, which is to be mounted upon the support member, retained thereon, is engaged with said body member as a result of the engagement of said first engagement means of said clip member with said second engagement means of said body member; and fastener means disposed within said body member for radially expanding said body member into engagement with sidewall portions of the support member which define the aperture into which said body member is to be inserted so as to fixedly retain said body member within the aperture defined within the support member and thereby permit the component, to be supported upon said clip member, to be fixedly mounted upon the support member.

15. The combination as set forth in claim 14, wherein:

said fastener means comprises a screw fastener having a threaded shank portion.

16. The combination as set forth in claim 14, wherein:

said body member has a longitudinal axis;

said clip member has a longitudinal axis;

said clip member is substantially coaxially disposed with respect to said body member when said first engagement means of said clip member is snap-engaged with said second engagement means of said body member; and said fastener means is disposed within both said clip member and said body member when said clip member is substantially coaxially disposed with respect to said body member.

17. The combination as set forth in claim 16, wherein:

said retaining means of said clip member comprises a first tooth, extending radially outwardly with respect to said longitudinal axis of said clip member, for engaging the component to be retained upon said clip member;

said first engagement means of said clip member comprises a second tooth extending radially outwardly with respect to said longitudinal axis of said clip member; and said second engagement means of said body member comprises a catch for engaging said second tooth of said clip member.

18. The combination as set forth in claim 17, wherein:

said first and second teeth of said clip member are disposed upon flexible blade members which are mounted upon said clip member at diametrically opposite positions with respect to said longitudinal axis of said clip member.

19. The combination as set forth in claim 18, wherein:

said fastener means comprises a screw fastener having a threaded shank portion; and said clip member comprises additional radially inwardly extending teeth means for engaging said threaded shank portion of said fastener means so as to fixedly retain said fastener means within said clip member and said body member.

20. The combination as set forth in claim 19, wherein:

said additional radially inwardly extending teeth means of said clip member are disposed upon said flexible blade members of said clip member.

21. The combination as set forth in claim 16, wherein:

said fastener member comprises a screw fastener having a threaded shank portion; and said clip member comprises radially inwardly extending teeth means for engaging said threaded shank portion of said fastener means so as to fixedly retain said fastener means within said clip member and said body member.

22. The combination as set forth in claim 16, wherein:

said body member has axially extending slot means defined therein for permitting said body member to be radially expanded when said fastener means is axially inserted into said body member such that said body member can fixedly engage sidewall portions of the support member which define the aperture into which said body member is to be inserted.

23. The combination as set forth in claim 22, wherein:

said fastener means comprises a screw fastener having a threaded shank portion; and said clip member comprises radially inwardly extending teeth means for engaging said threaded shank portion of said fastener means so as to fixedly retain said fastener means within said clip means and said body member and thereby fixedly retain said body member in its radially expanded state within the aperture defined within the support member upon which the component is to be mounted by said fastener system.

24. The combination as set forth in claim 16, further comprising:

a fastener strap integrally connecting said clip member to said body member.

25. The combination as set forth in claim 24, wherein:

said fastener strap extends radially outwardly from each one of said body member and said clip member and with respect to each one of said longitudinal axes of said body member and said clip member; and said fastener strap is flexible so as to permit said clip member to be substantially coaxially disposed with respect to said body member when said first engagement means of said clip member is engaged with said second engagement means of said body member.

\* \* \* \* \*